(12) United States Patent
Jeong et al.

(10) Patent No.: US 12,388,152 B2
(45) Date of Patent: Aug. 12, 2025

(54) SECONDARY BATTERY IN WHICH A METAL MEMBER IS INSERTED INTO CAN BODY TO IMPROVE SAFETY

(71) Applicant: LG ENERGY SOLUTION, LTD., Seoul (KR)

(72) Inventors: Mingi Jeong, Daejeon (KR); Joo Hwan Sung, Daejeon (KR); Han Sol Park, Daejeon (KR); Hyeon Min Song, Daejeon (KR)

( * ) Notice: Subject to any disclaimer, the term of this patent is extended or adjusted under 35 U.S.C. 154(b) by 324 days.

(21) Appl. No.: 18/010,336

(22) PCT Filed: Mar. 8, 2022

(86) PCT No.: PCT/KR2022/003309
§ 371 (c)(1),
(2) Date: Dec. 14, 2022

(87) PCT Pub. No.: WO2022/250257
PCT Pub. Date: Dec. 1, 2022

(65) Prior Publication Data
US 2023/0344072 A1 Oct. 26, 2023

(30) Foreign Application Priority Data
May 28, 2021 (KR) .................. 10-2021-0069475

(51) Int. Cl.
*H01M 50/375* (2021.01)
*H01M 50/107* (2021.01)
(Continued)

(52) U.S. Cl.
CPC ....... *H01M 50/375* (2021.01); *H01M 50/107* (2021.01); *H01M 50/119* (2021.01);
(Continued)

(58) Field of Classification Search
CPC ............. H01M 50/375; H01M 50/107; H01M 50/152; H01M 50/119; H01M 50/342; H01M 2200/10
See application file for complete search history.

(56) References Cited

U.S. PATENT DOCUMENTS

| | | | | |
|---|---|---|---|---|
| 4,952,368 A | * | 8/1990 | Skenazi | .................. C22C 18/00 420/513 |
| 2007/0283558 A1 | * | 12/2007 | Kelemen | ............... H01M 50/56 29/623.5 |

(Continued)

FOREIGN PATENT DOCUMENTS

| | | |
|---|---|---|
| CN | 112072165 A | 12/2020 |
| DE | 102013206030 A1 * | 10/2014 .......... H01M 2/0285 |

(Continued)

OTHER PUBLICATIONS

EPO machine generated English translation of DE-102013206030-A1 (Year: 2014).*

(Continued)

*Primary Examiner* — Basia A Ridley
*Assistant Examiner* — Kimberly Wyluda

(57) ABSTRACT

A secondary battery includes an electrode assembly, and a battery case accommodating the battery case together with an electrolytic solution. The battery case includes a metal. The battery case is opened in its upper part; and a cap assembly that is coupled to the opened upper part of the can body. The can body includes a beading part that is bent inward at the upper part of the housing part, and a crimping part that is bent in a direction in which the cap assembly is located at an upper part of the beading part. At least one of the bottom part or the crimping part of the can body has a metal member inserted therein. The metal member has a lower melting point than the metal of the can body.

10 Claims, 2 Drawing Sheets

(51) Int. Cl.
*H01M 50/119* (2021.01)
*H01M 50/152* (2021.01)
*H01M 50/342* (2021.01)

(52) U.S. Cl.
CPC ....... *H01M 50/152* (2021.01); *H01M 50/342* (2021.01); *H01M 2200/10* (2013.01)

(56) References Cited

U.S. PATENT DOCUMENTS

| | | |
|---|---|---|
| 2012/0114986 A1 | 5/2012 | Kim et al. |
| 2012/0177984 A1 | 7/2012 | Lee et al. |
| 2013/0095355 A1 | 4/2013 | Okutani et al. |
| 2014/0242448 A1* | 8/2014 | Kakinuma .......... H01M 50/133 429/174 |
| 2018/0315964 A1* | 11/2018 | Nam ................ H01M 50/1243 |
| 2020/0035968 A1 | 1/2020 | Ji et al. |
| 2020/0144686 A1 | 5/2020 | Jang et al. |
| 2021/0296724 A1 | 9/2021 | Jeong |

FOREIGN PATENT DOCUMENTS

| | | |
|---|---|---|
| EP | 3 783 685 A1 | 2/2021 |
| JP | S62-13329 Y2 | 4/1987 |
| JP | H10-269998 A | 10/1998 |
| JP | 2006-185708 A | 7/2006 |
| JP | 2006-228520 A | 8/2006 |
| JP | 2013-069611 A | 4/2013 |
| JP | 2018-092814 A | 6/2018 |
| KR | 10-0973423 B1 | 8/2010 |
| KR | 10-2011-0006826 A | 1/2011 |
| KR | 10-1222246 B1 | 1/2013 |
| KR | 10-2013-0063206 A | 6/2013 |
| KR | 10-2013-0088042 A | 8/2013 |
| KR | 10-1483703 B1 | 1/2015 |
| KR | 2015-0050154 A * | 5/2015 |
| KR | 10-2016-0043725 A | 4/2016 |
| KR | 10-2017-0007876 A | 1/2017 |
| KR | 10-2018-0087606 A | 8/2018 |
| KR | 10-2018-0113809 A | 10/2018 |
| KR | 10-2183539 B1 | 11/2020 |

OTHER PUBLICATIONS

EPO machine generated English translation of KR-2015-0050154-A (Year: 2015).*
English Translation of Notice of Allowance dated Dec. 5, 2023 of the corresponding Japanese Patent Application No. 2022-571358.
International Search Report issued Jul. 6, 2022 in the corresponding International Patent Application No. PCT/KR2022/003309.
Extended European Search Report dated Jul. 23, 2024 issued in European Patent Application No. 22803157.1. Note: US 2012/0177984 A1 and US 2013/0095355 A1 cited therein are already of record.
Office Action dated Mar. 28, 2025 issued in corresponding Korean Patent Application No. 10-2021-0069475.

* cited by examiner

[FIG. 1]
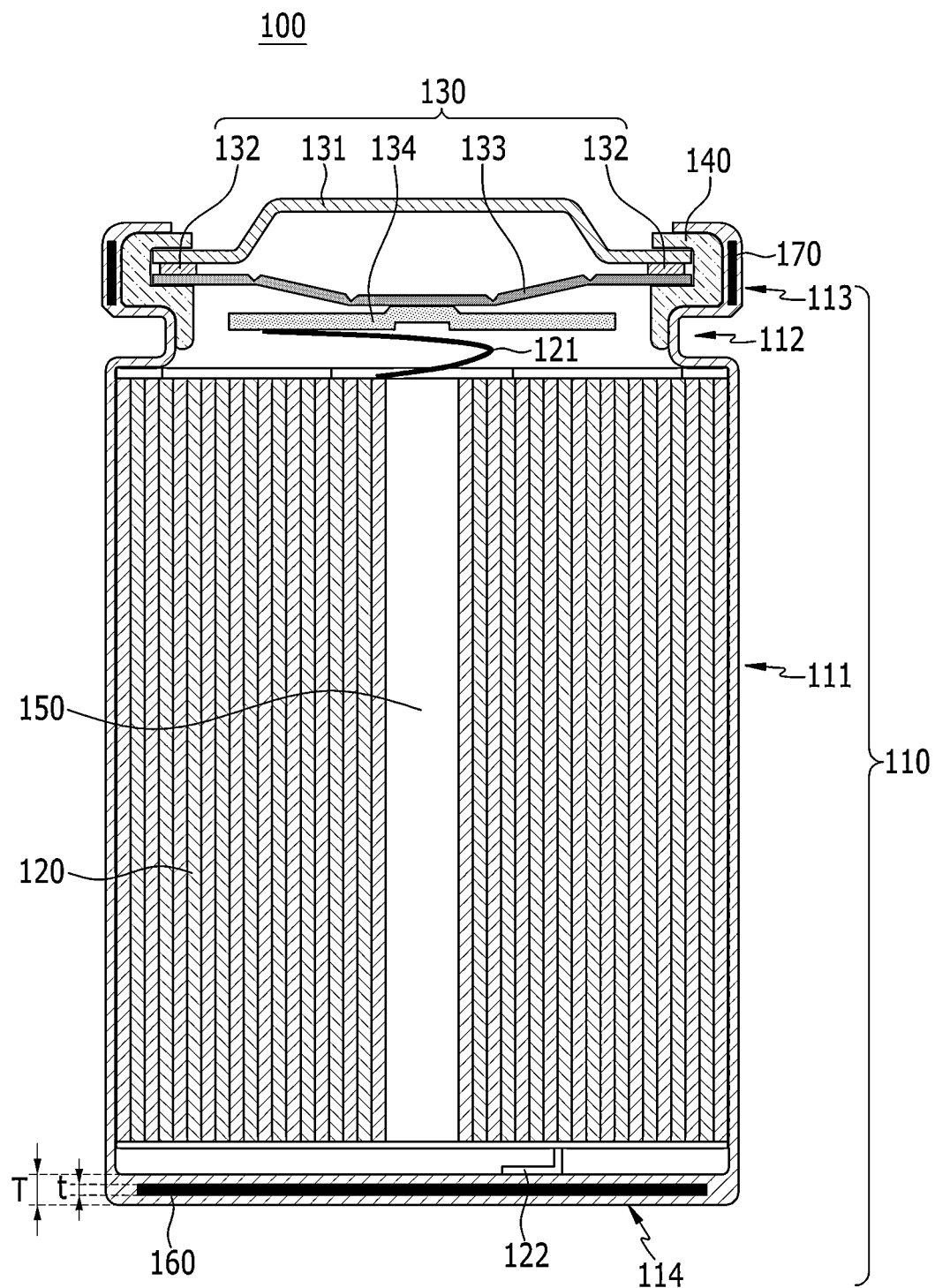

[FIG. 2]
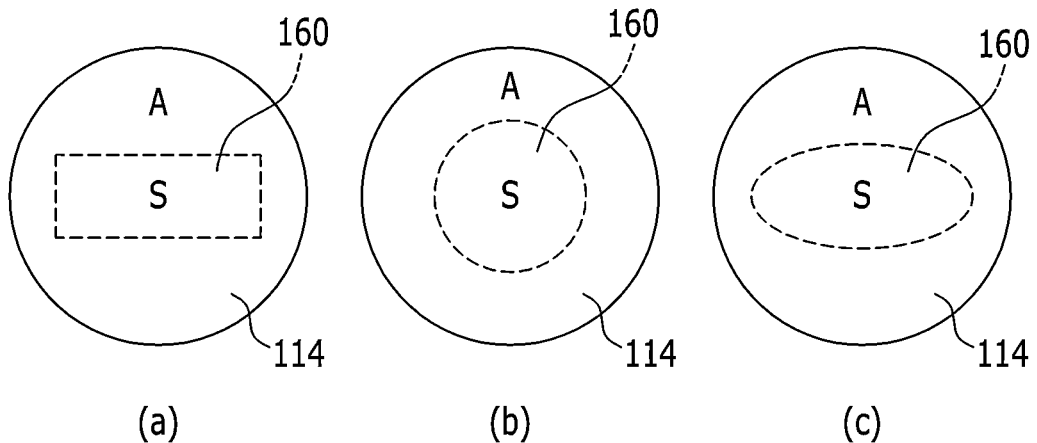
[FIG. 3]
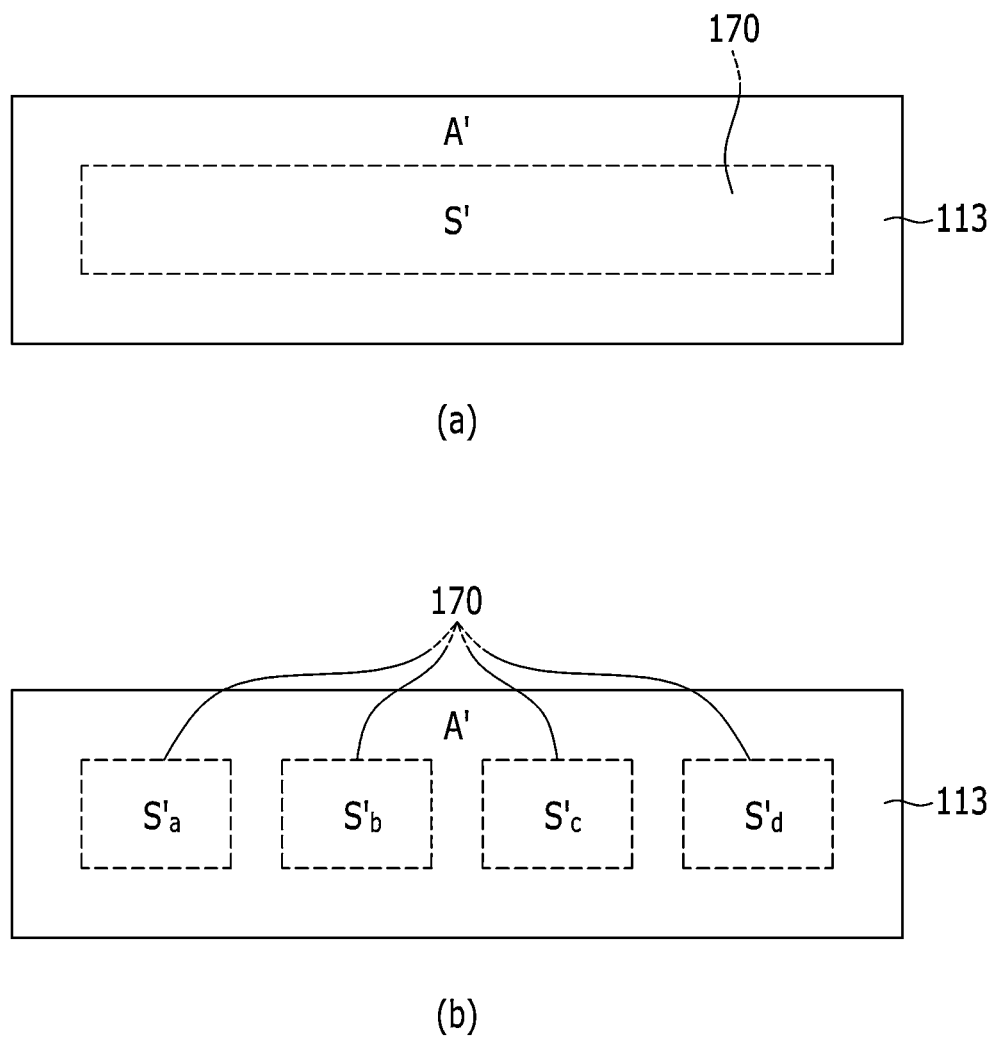

SECONDARY BATTERY IN WHICH A METAL MEMBER IS INSERTED INTO CAN BODY TO IMPROVE SAFETY

CROSS CITATION WITH RELATED APPLICATION(S)

This application claims the benefit of Korean Patent Application No. 10-2021-0069475 filed on May 28, 2021 with the Korean Intellectual Property Office, the content of which is incorporated herein by reference in its entirety.

TECHNICAL FIELD

The present disclosure relates to a secondary battery in which a metal member is inserted in a can body to improve safety.

BACKGROUND

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

In recent years, as mobile devices, such as portable computers, portable phones, and cameras, have been increasingly developed, the demand for secondary batteries has also sharply increased as an energy source for the mobile devices. Among such secondary batteries is a lithium secondary battery exhibiting high charge/discharge characteristics and lifetime characteristics and being environmentally friendly, in which much research has been carried out and which is now commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is actively being conducted, a part of which are in the commercialization stage.

Depending upon the shape of a battery case, a secondary battery may generally include a cylindrical secondary battery or a prismatic secondary battery in which a stacked/folded type, or wound type electrode assembly is housed in a case made of metal as a battery case, a pouch type secondary battery in which a stacked type or stacked/folding type electrode assembly is built into a pouch type battery case made of an aluminum laminate sheet, and the like.

Meanwhile, as the cylindrical battery is used as a battery for an electric vehicle, the safety aspect of the cylindrical battery is emerging as a more important issue.

Particularly, when a fire occurs in a vehicle, the ignition of one cylindrical battery affecting the other batteries may lead to a chain ignition of the battery, which may lead to a bigger accident.

Therefore, when the battery is exposed to high temperature and ignites, the side surface of the cylindrical can be damaged, and the situation needs to be ended, but the current design of the cylindrical cannot guarantee that the side surface of the can will not be damaged.

Therefore, there is a need to develop a technology for a secondary battery that can solve these problems and prevent damage to the side surface of the battery.

DETAILED DESCRIPTION OF THE INVENTION

Technical Problem

The present disclosure has been designed to solve the above-mentioned problems and other technical problems that have yet to be resolved.

Specifically, it is an object of the present disclosure to provide a secondary battery that can prevent damage to the side surface of the can body and minimize the effect on the surrounding secondary batteries so as to prevent continuous ignition, and further ensures that the action of pressure due to the pressure rise during internal ignition of the secondary battery is applied to the upper and lower ends of the can body rather than the side surface.

Technical Solution

According to one embodiment of the present disclosure, there is provided a secondary battery in which an electrode assembly including a cathode, a separator and an anode is housed in a battery case together with an electrolytic solution, wherein the battery case is made of metal,
wherein the battery case includes a can body that includes a housing part for housing the electrode assembly and the electrolytic solution and is opened in its upper part; and a cap assembly that is coupled to the opened upper part of the can body,
wherein the can body includes a beading part that is bent inward at the upper part of the housing part, and a crimping part that is bent in a direction in which the cap assembly is located at an upper part of the beading part,
wherein at least one of the bottom part or the crimping part of the can body has a metal member inserted therein, and
wherein the metal member has a lower melting point than the metal of the can body.

Wherein, the can body may be made of a metal having a melting point of 1000° C. to 2000° C., and the metal member may be made of a metal having a melting point of 200° C. to 600° C.

Specifically, the battery case may be made of a metal containing any one selected from the group consisting of aluminum, nickel, stainless steel (SUS), copper, iron, bronze, and brass, and the metal member may be made of a metal containing any one selected from the group consisting of tin (Sn), zinc (Zn), and lead (Pb).

Further, the metal member may be included in both the bottom part and the crimping part of the can body.

A planar shape of the metal member contained in the bottom part of the can body may be polygonal, circular, or elliptical, and the metal member contained in the crimping part may be included in a continuous or discontinuous band shape partially or wholly in the longitudinal direction around the crimping part.

Wherein, in the bottom part of the can body, the metal member may be included in a size of 10% to 90% of the total area of the bottom part, and in the crimping part, the metal member may be included in a size of 10% to 90% of the total area of the crimping part.

Further, the metal member may be included so as to have a thickness of 20% to 90% of a metal thickness forming the can body.

In one specific embodiment, the can body may be a cylindrical case, and the electrode assembly may be a jelly-roll type or stacked/folding type electrode assembly.

BRIEF DESCRIPTION OF THE DRAWINGS

FIG. 1 is a schematic diagram of a secondary battery according to an embodiment of the present disclosure;

FIG. 2 is a top view of a bottom part of the secondary battery of FIG. 1; and

FIG. 3 is a schematic diagram of a state in which a portion corresponding to the crimping part is virtually stretched in the circumferential direction in order to represent the metal member in the crimping part of the secondary battery of FIG. 1.

DETAILED DESCRIPTION OF THE EMBODIMENTS

Hereinafter, the present disclosure will be described in more detail for a better understanding of the present disclosure.

Terms or words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way.

The technical terms provided herein is merely used for the purpose of describing particular embodiments only, and is not intended to be limiting of the present disclosure. The singular forms "a," "an," and "the" are intended to include the plural forms as well, unless the context clearly indicates otherwise.

The term "including" or "comprising" as used herein specifies a specific feature, integer, step, action, component or a combination thereof, but does not exclude the presence or addition of a different specific feature, integer, step, component and/or a combination thereof.

According to one embodiment of the present disclosure, there is provided a secondary battery in which an electrode assembly including a cathode, a separator and an anode is housed in a battery case together with an electrolytic solution, wherein the battery case is made of metal,
wherein the battery case includes a can body that includes a housing part for housing the electrode assembly and the electrolytic solution and is opened in its upper part; and a cap assembly that is coupled to the opened upper part of the can body,
wherein the can body includes a beading part that is bent inward at the upper part of the housing part, and a crimping part that is bent in a direction in which the cap assembly is located at an upper part of the beading part,
wherein at least one of the bottom part or the crimping part of the can body has a metal member inserted therein, and
wherein the metal member has a lower melting point than the metal of the can body.

In the following, the term 'metal' is a concept that includes not only a single metal, but also an alloy.

In this case, the can body is not limited as long as it is a metal having a high temperature melting point, and for example, it may be made of a metal having a melting point of 1000° C. to 2000° C. More specifically, it may be made of a metal containing any one selected from the group consisting of aluminum, nickel, stainless steel (SUS), copper, iron, bronze, and brass.

Here, the metal containing any one is a concept including all of an alloy or a single metal, if at least one of the above materials is included.

However, specifically, the can body may be made of iron or stainless steel.

Meanwhile, the metal member may be made of a metal having a lower melting point than that of a metal (alloy or single metal) constituting the can body.

Specifically, if the melting point of the metal member is lower than that of the metal of the can body, the type of the metal member is not limited, but for example, it may be made of a metal having a melting point of 200° C. to 600° C., and more specifically, it may be made of a metal containing any one selected from the group consisting of tin (Sn), zinc (Zn), and lead (Pb).

This also is the same as the description of the metal of the can body, and specifically, the metal member may be tin or zinc.

When a metal member with a low melting point is included in the metal forming the bottom or crimping part of the can body as described above, the bottom part and/or the crimping part of the can body become weak as the temperature rises during internal ignition of the secondary battery, and accordingly, the action of pressure due to the pressure rise is applied to the bottom part or the crimping part, whereby the action of the pressure can be minimized on the side surface of the can body, and thus the influence on the peripheral secondary batteries can be reduced.

In the present disclosure, a schematic diagram of such a secondary battery is shown in FIG. 1.

Referring to FIG. 1, a secondary battery 100 according to the present disclosure is formed of a structure in which an electrode assembly 120 including a cathode, a separator and an anode is housed together with an electrolytic solution in a can body 110 that includes a housing part 111 as a battery case and is opened in its upper part, and a cap assembly 130 is coupled to the opened upper part of the can body 110.

Wherein, the can body 110 is a cylindrical case.

Wherein, the can body 110 includes a housing part 111 that supports the electrode assembly 120 and includes a bottom part 114 and a side surface extending upwardly from the bottom part, a beading part 112 that is bent inward on the upper part of the housing part 111, and a crimping part 113 that is bent in the direction in which the cap assembly 130 is located at the upper part of the beading part 112.

At this time, in the bottom part 114 and the crimping part 113 of the can body 110, the respective metal members 160 and 170 are inserted inside the metal forming these.

Of course, it may be included in at least one of these, but it is advantageous that pressure acts on both the upper and lower sides in order to further reduce the influence on the side surface of the can body 110. Thus, it is more preferable that the metal members 160 and 170 are respectively inserted into both the bottom part 114 and the crimping part 113 as in FIG. 1.

Meanwhile, the respective metal members 160 and 170 only need to be contained in the bottom part 114 and the crimping part 113 of the can body 110 to the extent that the effect intended by the present disclosure is exhibited, and its shape, area, thickness, etc. are not limited.

In this regard, FIG. 2 schematically shows a top view of the bottom part 114 in order to explain the metal member 160 inserted into the bottom part 114 of the can body 110.

Referring to FIG. 2, the planar shape of the metal member 160 inserted into the bottom part 114 of the can body 110 may be polygonal (a), circular (b), or elliptical (c), and is not limited.

Meanwhile, the planar area thereof is also not particularly limited as long as it is included to the extent that the effect intended by the present disclosure is exhibited. However, in order to effectively exhibit the effect intended by the present disclosure, the area (S) may be 10% to 90% of the total area (A) of the bottom part 114, specifically, 20% to 90%, and more specifically 30% to 80%.

If the area is too small outside the above range, the effect intended by the present disclosure may be insignificant, and if the area is too large, the rigidity of the can body 110 itself may be weakened, which is not preferable.

Meanwhile, FIG. 3 schematically shows a state in which a portion corresponding to the crimping part 113 is virtually stretched in the peripheral direction in order to explain the metal member 170 inserted into the crimping part 113 of the can body 110.

The metal member 170 included in the crimping part 113 is also not limited in its shape, but it is preferably formed in the circumferential direction from the side surface. Therefore, as shown in FIG. 3, it may be included in a band shape partially or wholly in the longitudinal direction around the crimping part 113.

Meanwhile, it may be included in a continuous band shape as shown in FIG. 3(a), and may be formed in a non-continuous band shape as shown in FIG. 3(b).

In addition, the formation area $(S'_a+S'_b+S'_c+S'_d)$ of the metal member 170 is not limited if it the extent that the effect intended by the present disclosure can be exhibited, similarly to the bottom part 114. However, in order to effectively exhibit the effect intended by the present disclosure, the area (S') may be 10% to 90% of the total area (A') of the crimping part 113, specifically 20% to 90%, more specifically 30% to 80%.

Here, in the criterion for describing the area, in relation to the beading part 112, from a straight line portion formed in a direction parallel to the insertion direction of the electrode assembly 120 away from the bent part of the beading part 112, to the end part of the can body 110 bent in the direction of the cap assembly 130 and coupled to the cap assembly 130 is regarded as the crimping part 113.

The meaning of the numerical limitation is also the same as the reason for the numerical limitation of the area of the metal member 160 at the bottom part 114.

Meanwhile, referring to FIG. 1 again, the thickness t of the respective metal members 160 and 170 included in the bottom part 114 and/or the crimping part 113 of the can body 110 may include 10% to 90%, more specifically 20% to 80%, and more specifically 30% to 60% of the metal thickness T forming the can body 110.

If the thickness is too thin outside the above range, the effect intended by the present disclosure may be insignificant, and if the thickness is too thick, the rigidity of the can body 110 itself may be weakened, which is not preferable.

Next, the configuration of other secondary batteries will be described in detail.

The electrode assembly 120 is, but is not limited to, a jelly-roll type or a stack/folding type electrode assembly.

The jelly-roll type electrode assembly is manufactured by interposing and winding a sheet-shaped separator between a sheet-shaped cathode and a sheet-shaped anode.

The stack/folding type electrode assembly is manufactured by winding, on a sheet-shaped separation film, a unit electrode, a unit electrode and a separator, full cells stacked so that electrodes of the same polarity are positioned at both ends, and bicells stacked so that electrodes of different polarities are positioned at both ends.

Specific configurations of such a jelly-roll type electrode assembly and a stack/folding type electrode assembly are conventionally known, and thus, detailed descriptions thereof will be omitted herein.

Further, since the specific configuration of the electrode assembly of the present disclosure, and the specific description of the cathode, the anode, the separator, and the electrolytic solution are conventionally known, the detailed description thereof will be omitted herein.

Further, the secondary battery 100 according to the present disclosure includes a gasket 140 mounted on the upper part of the beading part 112 of the can body 110, and the cap assembly is formed of a structure which includes: an upper cap 131, a current interrupt safety device (PTC device) 132 and a safety vent for internal pressure drop 133 stacked under the upper cap 131, and a current interrupt device (CID) 134 formed at the lower end of the safety vent 133.

In addition, the cathode tab 121 and the anode tab 122 are drawn out from the electrode assembly 120, the cathode tab 121 is electrically connected to the cap assembly 130, and the anode tab 122 is connected to the bottom part 114 of the can body 130.

Here, the current interrupt safety device 132, the safety vent 133, and the current interrupt device 134 are preferably all structures through which current flows, and are formed to secure the safety of the secondary battery.

Since other specific details are conventionally known, a description thereof will be omitted herein.

Furthermore, the secondary battery 100 according to the present disclosure includes a center pin 150 having a hollow structure that is inserted into the central part of the electrode assembly 120.

At this time, the center pin 150 may also be made of a metal, specifically, a metal containing any one selected from the group consisting of aluminum, nickel, stainless steel (SUS), copper, iron, bronze, and brass, similarly to the can body 110.

Those of ordinary skill in the art will be able to make various applications and modifications within the scope of the present disclosure based on the above contents.

INDUSTRIAL APPLICABILITY

As described above, the secondary battery according to an embodiment of the present disclosure is configured such that in the bottom part and/or the crimping part of the can body of the battery case, a metal member having a lower melting point than the metal constituting the can body is inserted therein, the bottom part of and/or the crimping part of the can body are weakened as the temperature rises during internal ignition of the secondary battery, and the action of pressure due to the pressure rise is applied to the lower end and upper end of the secondary battery, whereby the pressure action on the side of the can body can be minimized, thus reducing the influence on the surrounding secondary batteries and preventing a chain ignition.

The invention claimed is:

1. A secondary battery, comprising:
an electrode assembly including a cathode, a separator, and an anode;
a battery case to accommodate the electrode assembly therein together with an electrolytic solution,
wherein the battery case includes a metal,
wherein the battery case includes:
- a can body that includes a housing part configured to accommodate the electrode assembly and the electrolytic solution, and the battery case is opened in its upper part; and
- a cap assembly that is coupled to the opened upper part of the can body, wherein the can body includes a beading part that is bent inward at the upper part of the can body, and a crimping part that is bent in a direction in which the cap assembly is located at an upper part of the beading part, wherein at least one of a bottom part or the crimping part of the can body has a metal member inserted therein such that the metal member is surrounded by the metal of the can body,
wherein, in the bottom part of the can body, the metal member has a size of 10% to 90% of a total area of the bottom part, and
wherein the metal member has a lower melting point than the metal of the can body.

2. The secondary battery of claim 1, wherein the metal of the battery case has a melting point of 1000° C. to 2000° C., and
wherein the metal member has a melting point of 200° C. to 600° C.

3. The secondary battery of claim 1, wherein the metal of the battery case includes any one selected from the group consisting of aluminum, nickel, stainless steel (SUS), copper, iron, bronze, and brass, and
wherein the metal member includes any one selected from the group consisting of tin (Sn), zinc (Zn), and lead (Pb).

4. The secondary battery of claim 1, wherein the metal member is in both the bottom part and the crimping part of the can body.

5. The secondary battery of claim 1, wherein a planar shape of the metal member in the bottom part of the can body is polygonal, circular, or elliptical.

6. The secondary battery of claim 1, wherein the metal member in the crimping part has a continuous or discontinuous band shape partially or wholly in a longitudinal direction around the crimping part.

7. The secondary battery of claim 1, wherein, in the crimping part, the metal member has a size of 10% to 90% of a total area of the crimping part.

8. The secondary battery of claim 1, wherein the metal member has a thickness of 10% to 90% of a metal thickness of the can body.

9. The secondary battery of claim 1, wherein the can body includes a cylindrical case.

10. The secondary battery of claim 1, wherein the electrode assembly is a jelly-roll type or stacked/folding electrode assembly.

* * * * *